United States Patent
Gladney et al.

(10) Patent No.: US 12,289,346 B2
(45) Date of Patent: *Apr. 29, 2025

(54) USING CACHED SUMMARIES FOR EFFICIENT ACCESS ANALYSIS FOR CLOUD PROVIDER ENTITIES

(71) Applicant: Rapid7, Inc., Boston, MA (US)

(72) Inventors: Matthew Gladney, Boston, MA (US); Elizabeth Prescott, Fairfax, VA (US); Niluka Bamunuarachchige, Centreville, VA (US); Leonardo Colmenares, Washington, DC (US); James Martin, Washington, DC (US); Peter Snelgrove, Annandale, VA (US); Nadia Mounzih, Washington, DC (US)

(73) Assignee: Rapid7, Inc., Boston, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/666,650

(22) Filed: May 16, 2024

(65) Prior Publication Data

US 2024/0305670 A1     Sep. 12, 2024

Related U.S. Application Data

(63) Continuation of application No. 17/543,599, filed on Dec. 6, 2021, now Pat. No. 12,021,900.

(51) Int. Cl.
*H04L 9/40*   (2022.01)
*G06F 16/31*  (2019.01)

(52) U.S. Cl.
CPC ........... *H04L 63/20* (2013.01); *G06F 16/322* (2019.01); *H04L 63/104* (2013.01); *H04L 63/105* (2013.01)

(58) Field of Classification Search
CPC ..... H04L 63/20; H04L 63/104; H04L 63/105; G06F 16/322
See application file for complete search history.

(56) References Cited

U.S. PATENT DOCUMENTS 6,202,066 B1   3/2001  Barkley et al.
9,218,502 B1  12/2015  Doermann et al.
(Continued)

FOREIGN PATENT DOCUMENTS

CN   102307185 A    1/2012
KR   20030057263 A  7/2003

OTHER PUBLICATIONS

Majumdar et al., Security compliance auditing of identity and access management in the cloud: Application to OpenStack. 2015 IEEE 7th International Conference on Cloud Computing Technology and Science (CloudCom). Nov. 30, 2015:58-65.

*Primary Examiner* — David J Pearson
(74) *Attorney, Agent, or Firm* — Wolf, Greenfield & Sacks, P.C.

(57) ABSTRACT

An access policy analysis system may use stored policy summaries to efficiently perform access analysis. A request that causes an access analysis of an entity in a cloud service provider with respect to a resource hosted in the cloud service provider may be received. An access policy summary generated for the entity based on a set of access policies applied by an access management system of the cloud service provider may be obtained. An access policy summary generated for the resource based on the set of access policies may be obtained. A tree structure that describes a hierarchy of entities in the cloud service provider may be traversed to identify a parent node of the entity in the hierarchy of entities. The access analysis may then be generated based on the access policy summaries for the identified node in the tree structure, for the entity and for the resource.

20 Claims, 8 Drawing Sheets

(56) References Cited

U.S. PATENT DOCUMENTS

| | | |
|---|---|---|
| 9,516,028 B1 | 12/2016 | Andruschuk et al. |
| 10,129,344 B2 | 11/2018 | Pogrebinsky et al. |
| 10,880,189 B2 | 12/2020 | Martinez et al. |
| 12,021,900 B1 * | 6/2024 | Gladney ................. H04L 63/20 |
| 2005/0262132 A1 | 11/2005 | Morita et al. |
| 2008/0104393 A1 | 5/2008 | Glasser et al. |
| 2011/0131275 A1 | 6/2011 | Maida-Smith et al. |
| 2013/0219156 A1 | 8/2013 | Sears |
| 2013/0290500 A1 | 10/2013 | Narendra et al. |
| 2014/0280961 A1 | 9/2014 | Martinez et al. |
| 2017/0054757 A1 | 2/2017 | Siswick et al. |
| 2017/0141961 A1 | 5/2017 | Cao et al. |
| 2018/0091583 A1 | 3/2018 | Collins et al. |
| 2018/0268347 A1 | 9/2018 | Benedetti et al. |
| 2019/0121989 A1 | 4/2019 | Mousseau et al. |
| 2019/0327271 A1 | 10/2019 | Saxena et al. |
| 2020/0225655 A1 | 7/2020 | Cella et al. |
| 2022/0156631 A1 | 5/2022 | Kanso et al. |
| 2022/0210201 A1 | 6/2022 | Kastroulis |
| 2022/0263835 A1 | 8/2022 | Pieczul et al. |
| 2022/0353289 A1 | 11/2022 | Witschey et al. |
| 2023/0019705 A1 | 1/2023 | Zettel, II et al. |
| 2023/0090828 A1 | 3/2023 | Patro et al. |
| 2023/0148158 A1 | 5/2023 | Bandarupalli et al. |

\* cited by examiner

USING CACHED SUMMARIES FOR EFFICIENT ACCESS ANALYSIS FOR CLOUD PROVIDER ENTITIES

CROSS-REFERENCE TO RELATED APPLICATIONS

This application is a continuation of and claims priority under 35 U.S.C. § 120 to U.S. patent application Ser. No. 17/543,599, filed Dec. 6, 2021, entitled "USED CACHED SUMMARIES FOR EFFICENT ACCESS ANALYSIS FOR CLOUD PROVIDER ENTITIES", which is hereby incorporated by reference in its entirety.

BACKGROUND

Cloud service providers offer opportunities to develop and host many different systems, services, or applications without imposing various infrastructure and other management responsibilities on customers. Because cloud service providers can host large numbers of systems, services, or applications, and the implementations of these different systems, services, or application is often distributed across many different resources, there are security and other operational risks when allowing different developers, users, or other entities access to the various resources hosted in a provider network. To mitigate these risks, cloud service providers have implemented access control systems, which allow customers of the cloud service providers to specify access controls for various entities with respect to resources hosted by the cloud service providers.

SUMMARY OF EMBODIMENTS

The systems and methods described herein may be employed in various combinations and in embodiments to implement an access policy analysis system that uses stored policy summaries to efficiently perform access analysis. To generate an access analysis of an entity in a cloud service provider with respect to a resource hosted in the cloud service provider, a tree structure that describes a hierarchy of entities in the cloud service provider may be used, where nodes in the tree structure correspond to access policy summaries that are generated from a set of access policies applied by the cloud service provider. An access policy summary generated for the entity based on the set of access policies may also be obtained. An access policy summary generated for the resource based on the set of access policies may also be obtained. The access analysis may then be generated based on the access policy summaries for one or more identified nodes in the tree structure, such as a parent node for the entity, and the access policy summaries obtained for the entity and for the resource. The access analysis may be provided by the access policy analysis system in response to a request for the access analysis.

Figure 1:
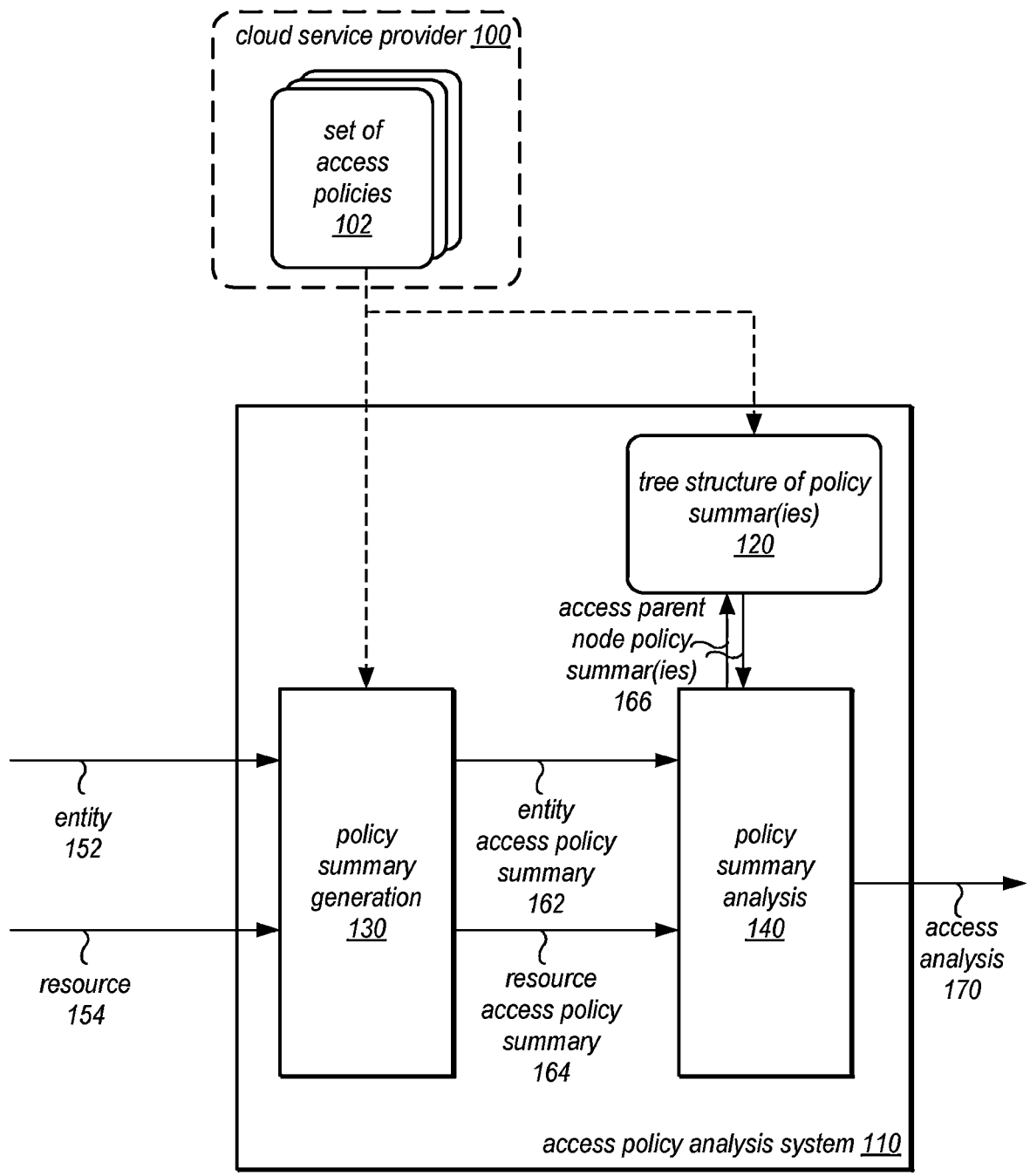
FIG. 1 is a block diagram illustrating using stored policy summaries for efficient analysis for cloud provider entities, according to some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION OF EMBODIMENTS

Various techniques of using stored policy summaries for efficient analysis for cloud provider entities are described herein. Different cloud providers allow users to specify or manage the relationships between different entities that can take actions with respect to resources hosted in a cloud provider. For example, these relationships may include a hierarchy that relates one (or more entities) to another entity higher in the hierarchy. A principal, may be one example of an entity that could relate to other entities, such as a group of principals associated with a same account, and a group of accounts associated with a same organization. These or other relationships between entities may allow users of cloud providers to determine the allowed (or denied) actions of entities both with respect to particular entities and resources (e.g., by attaching or otherwise associating access policies that define the allowed actions to entities and resources) and through the relationships of entities with other entities (which may also have associated access policies). The ability of an entity to perform a respective action may thus depend upon a number of different variables (e.g., directly through associated access policies and the access policies associated with related entities and resources). Therefore, any attempt to correctly determine the access of different entities with respect to different resources in a cloud provider may have to account for a potentially large number of variables.

While a brute force access analysis technique may be implemented, the computational time and costs for identifying and calculating the access results for a given entity and resource according to these different variables can quickly become prohibitive (e.g., causing processing times with an impractical wait time for results on the part of analysis users or amounts of computing resources that would have to be used in order to provide a timely analysis result). Moreover, the growing reliance on cloud service providers in terms of numbers of resources hosted and entities taking actions with respect to those resources (as well as the number of possible actions changing or growing) makes efficient access analysis techniques highly desirable.

In various embodiments, cached or otherwise stored policy summaries may be used for efficient analysis for cloud provider entities to reduce the computational complexity and costs of providing access analysis, without sacrificing the accuracy of results. In this way, the results of access analysis can be provided to implement and maintain well-designed access controls when using cloud service providers. The effects of generalizable access policies or collections of policies may be stored as policy summaries. These policy summaries may then be used to inform the analysis of other related entities, instead of reevaluating some access policies repeatedly.

For example, in one example embodiment, some access policies may be associated with a specific cloud provider service for an entire organization (e.g., that includes multiple accounts and principals), which may be referred to as service control policies. If service control policies are present, the effect of service control policies associated with an organization may only need to be evaluated once. Each related entity in the hierarchy (e.g., account or principal) may have additional service control policies that further define access for different actions, adding to an access analysis without recreating the access analysis of the service control policies higher in the hierarchy (e.g., at the organization level), instead of recreating the access analysis from the beginning. In such an example, a policy summary for the organization may include the service control policy, and thus may be stored and reused for subsequent evaluation (instead of expending the computational resources and time to rerun the access analysis for the organization).

Policy summaries may be created for multiple different entities. For instance, a policy summary may be created for a principal, which can then be reused for every resource paired with that principal. Moreover, the statements used to describe the effects of the policy can also be summarized and reused for different policies that utilize statements with the same logical effect. Each resource, in turn, may add nuance to the effective permissions determined as a result of access analysis, depending on the contents of the resource or conditional elements that may be evaluated against the resource.

Stored policy summaries may also provide for optimal evaluation orderings or other operations performance because the information provided in a summary can simplify subsequent access analysis. For example, in embodiments where an access policy specifies a "deny" (disallowing performance of an action or group of actions) and that "deny" cannot be overridden, there may be no need to continue analyzing that action in other applicable scenarios. In this way, a stored policy summary's inclusion of a "deny" can be used to shorten the access analysis with subsequent reevaluation. If, for instance, a service control policy denies an action without conditions, either implicitly or explicitly, that denial can be applied to that action without further analysis for every principal/resource pair associated with that service control policy (e.g., every principal in an account related to an organization associated with that service control policy). In this way, a policy summary can act as a maximum boundary for a given principal, dramatically limiting the amount of actions needing further evaluation.

Consider another example. If an access policy denies an action without conditions (which may be supported in access policies in some embodiments), that denial can be determined for every associated entity with that access policy associated. There may be no need to rerun the evaluation for every resource paired with that entity. The effect of specific policies can be summarized in a policy summary to be leveraged by every entity that has it attached.

FIG. 1 is a block diagram illustrating using stored policy summaries for efficient analysis for cloud provider entities, according to some embodiments. Access policy analysis system 110 may be a standalone system, application, tool, or service that may evaluate a given set of access policies 102 for a cloud service provider 100, in some embodiments. As discussed in detail below with regard to FIG. 3, access policy analysis system 110 may be a feature of a larger application, system, or service, such as cloud security service 230. Cloud service provider 100 may be a provider that offers access to various computing resources, services, applications, data storage or various other resources. Examples of cloud service provider 100 include, but are not limited to, GOOGLE CLOUD, AMAZON WEB SERVICES, and MICROSOFT AZURE.

In order to implement access controls to allow or deny various actions with respect to hosted resources, cloud service provider 100 may implement access policies that specify the various entities, resources, and actions allowed and denied for the different entities. Hierarchical relationships between different entities may be specified by establishing relationships or associations between "objects" representing the entities in cloud servicer provider 100, such as may be implemented as part of an access system or service of cloud service provider 100 that enforces access controls for cloud service provider 100. Access policies may be specified in proprietary or custom languages, scripts, interfaces, or other editors, or may be specified in various other languages or scripts, such as human readable scripts like Javascript Object Notation (JSON), among other possible languages or scripts. The relationships between the different objects can be modeled or specified in different ways, such as a hierarchical data structure like a tree or other hierarchy, in some embodiments.

Figure 2:
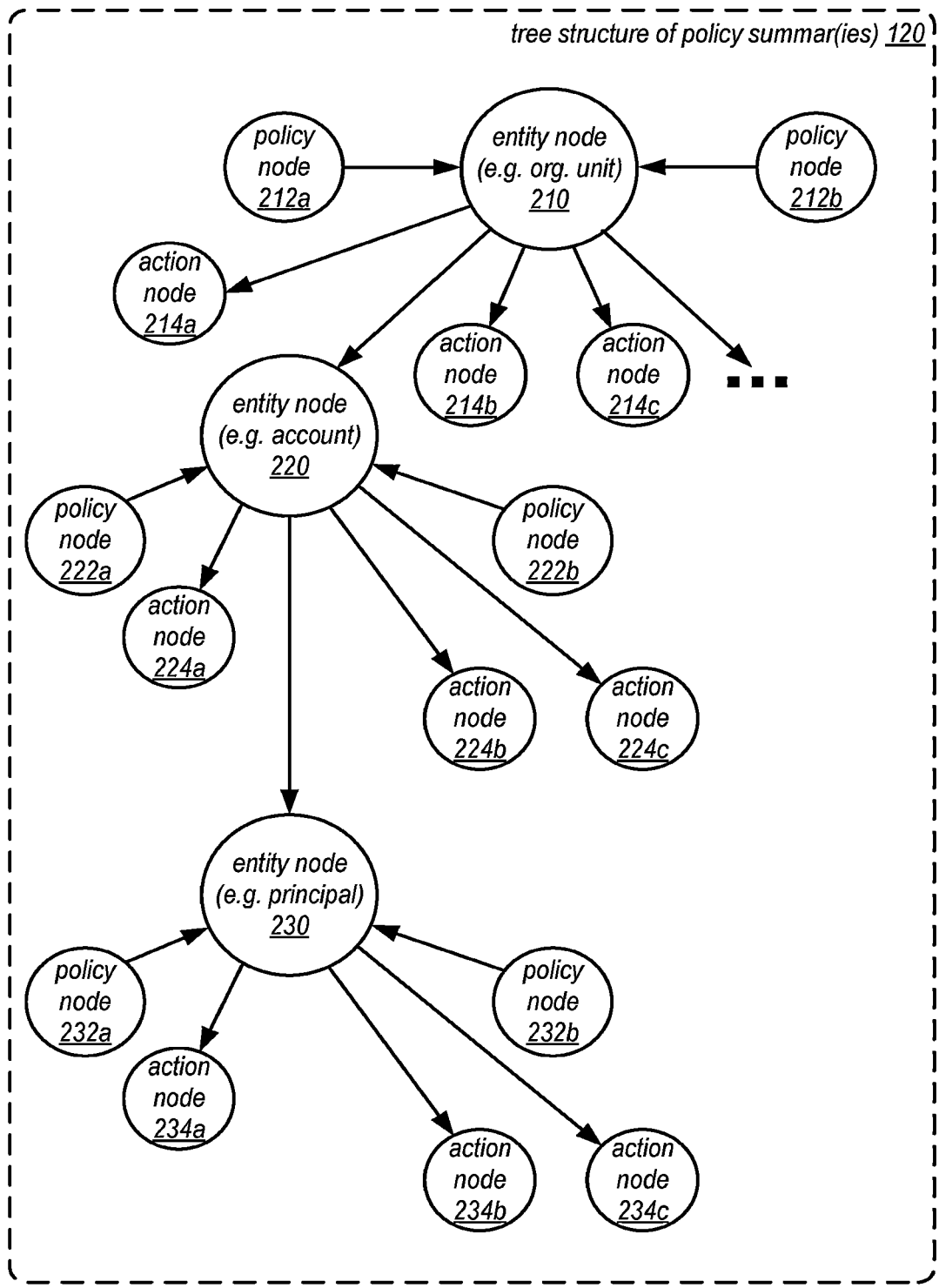
FIG. 2 is a block diagram illustrating a tree structure of policy summaries, according to some embodiments.

A set of access policies 102 may be maintained on behalf of an entity (or group of entities) that utilize cloud service provider 100. For example, an organization that utilizes cloud service provider 100 may have an organization specific hierarchy that includes the various objects along with associations of policies (and in some cases resources). In some embodiments, these associations may be described as attachments between a policy and an object (e.g., an attachment of a service control policy to an organization or account object). Different types of access policies may be supported by cloud service provider. For example, access policies may have various parameters or limitations (e.g., applicable on a service-wide, resource-type, identity-type, entity-type or at various other scopes) that allow for different access policies to be associated with different entities or resources according to type. FIG. 2, discussed below, provides one example of a set of possible entities and policy types, among other features of an access management system that may be implemented using access policies.

A set of access policies 102 may be shared (e.g., made readable) or copied to access policy analysis system 110 in order to be used for performing access analysis. As discussed in detail below with regard to FIG. 4, an ingestion feature of access policy analysis may perform ingestion processing on set of access policies 102 in order to pregenerate and store policy summaries. In other embodiments, set of access policies 102 may be accessed on demand (e.g., on a first access analysis evaluation, and then subsequently accessed as needed to obtain information for performing subsequent access analyses). When the subsequent access analysis requests are received, only the access policies not included in an already generated policy summary may be obtained and evaluated.

Policy summaries may be represented in different ways. FIG. 2 is a block diagram illustrating a tree structure of policy summaries, according to some embodiments, which may provide an efficient way of relating the different policy summaries generated for set of access policies when performing policy summary analyses. Tree structure of policy summar(ies) 120 may be maintained (e.g., in a data store, such as a database, object store, or other data storage system or device) accessible to or implemented as part of access policy analysis system 110. In this way, stored policy summaries may be identified and accessed, as discussed below.

Access policy and analysis system 110 may implement various interfaces or other mechanisms to obtain information, such as an entity 152 and resource 154, in order to perform an access analysis. For instance, as discussed in detail below with regard to FIG. 5, an interface may support a policy analysis request that includes an identifier for an entity 152 (e.g., a principal) and an identifier for a resource 154. Access policy analysis system 110 may implement policy summary generation 130 to generate, from set of access policies 102 that are applicable to entity 152 and resource 154 (e.g., attached or otherwise associated with entity 152 and resource 154) respective policy summaries, entity access policy summary 162 and resource access policy summary 164. Note that in some scenarios, one (or both) of these access policy summaries may be empty as there may be no access policies that are applicable to the entity 152 and resource 152. However, even in such a case there may be policies applicable to other entities through which the entity 152 and resource 154 inherit access policies (e.g., from parent entities in the hierarchy of entities). In some embodiments, prior to generating an entity policy summary 162 or resource policy summary 164 a check may be performed as to whether the entity policy summary 162 or resource policy summary 164 has already been generated. If so, then instead of generating a policy summary, the policy summaries may be obtained and provided to policy summary analysis 140.

Policy summary generation 130 may generate policy summaries according to various techniques. For example policy summary generation 130 may implement various language, script, or other types of parsers to extract access permissions and other information from access policies applicable to entity 152 or resource 154 in order to generate policy summaries (e.g., from statements in access policies). Policy summary generation 130 may create the appropriate data structures to summarize the effect of access policies in a format which corresponds to tree structure of policy summar(ies) 120, discussed in detail below with regard to FIG. 2.

Access policy analysis system 110 may implement policy summary analysis 140 to obtain the entity access policy summary 162 and resource access policy summary 164 as well as perform various operations to traverse tree structure of policy summar(ies) 120 in order to identify and access parent node policy summar(ies) 166 as part of generating an access analysis 170. For example, given entity 152 (e.g., a principal) and resource 154, policy summary analysis may be able to determine a "allowed" actions by the principal with respect to the resource, providing an effective access of the principal to the resource 154 that would be allowed by cloud service provider 100 according to set of access policies 102 using parent policy summar(ies) as well as a corresponding policy summary for the entity 152 under consideration for access analysis 170. As discussed in detail below with regard to FIG. 2 (and FIGS. 6 and 7), the use of parent node policy summaries identified and accessed 166 from tree structure of policy summar(ies) 120 may be used to determine the maximum permissions for given entity 152, which can then be refined by policies specific to the entity 152 and resource 154 (e.g., from resource policy access summary 164). Consider an example, wherein some actions are "deny" as determined from parent node policy summar(ies), such actions need not be considered again when evaluating other possible permutations of actions with respect to resource 154 by entity 152.

Access analysis 170 may provide a description or other indication of allowed (and denied) actions that may be taken by entity 152 with respect to resource 154, in various embodiments. Access analysis 170 may be provided in various forms according to the implementation of access policy analysis system 110. For instance, a display of access analysis 170 (e.g., graphically or via a text-based interface, such as a command-line interface) may display the contents of access analysis 170. In some embodiments, access analysis 170 may be stored for subsequent access. In some embodiments, access analysis 170 may be returned in a format corresponding to a programmatic interface, such as an Application Programming Interface (API). Although not depicted, the entity access policy summary 162 and resource access policy summary 164 may be stored in tree structure of policy summar(ies) 120 and used to answer subsequent requests for access analysis.

As noted above, FIG. 2 is a block diagram illustrating a tree structure of policy summaries, according to some embodiments. The relationships between policies and entities may be used to store and relate policy summaries so that tree structure 120 may be traversed and updated in order to efficiently identify applicable policy summaries and store new/updated policy information with respect to entities. In some embodiments, entity nodes, such as entity node 210, 220, and 230 may be used to represent different possible entities in a cloud service provider. In some embodiments, tree structure of policy summa(ies) 120 may be referred to as an action map.

Different cloud service providers may utilize different names, hierarchies, or other taxonomies of entities that can perform actions with respect to resources of a cloud service provider when permitted according to access policies. In one example embodiment, used as a working example below, entities may include organization units, accounts, and principals. Organization units may be used to collect one or more lower-level entities that can be managed together (e.g., accounts). Accounts may be an entity used to manage one or more lower-level entities (e.g., principals) and associated resources. Principals may be an entity that can act on a resource (e.g., a user or application). Thus, in FIG. 2, entity node 210 may include entity node 220 as one of possibly multiple accounts managed together as an organization unit. Likewise, entity node 220 may be an account that manages entity node 230 as a principal of possibly multiple principals managed together in the account.

Entity nodes may, in some embodiments, store a policy summary according to a schema (e.g., a schema common to all entity nodes or a schema common to an entity type, such as an organization unit, account, or principal). For example, entity node 210 may store a policy summary according to the following organization unit schema:

```
OU_Summary = {
    'service': {
    'action': ActionNode,
    '*': ActionNode
    },
    'service': {
    'action': ActionNode,
    '*': ActionNode
    },
    'service_control_policies': {
        'scp_identifier',
        'scp_identifier'
    }
}
```

Note that in such a summary, other objects in tree structure 120, such as action nodes, like action nodes node 214a, 214b, and 214c, may be referenced, which may allow for information stored in the action nodes to be incorporated into the policy summary for stored for the organization unit.

Below is an example of an organization unit summary:

```
OU_Summary_Sample = {
    'virtual_compute_service': {
        'describeinstances': ActionNode,
        'describekeypairs': ActionNode,
        'describesecuritygroups': ActionNode,
        'describeavailabilityzones': ActionNode,
        'runinstances': ActionNode,
        'terminateinstances': ActionNode,
        'stopinstances': ActionNode,
        'startinstances': ActionNode
    },
    'object_storage_service': {
        '*': ActionNode,
        'listallmyobjects': ActionNode,
        'headobject': ActionNode
    },
    'service_control_policies': {
        'policy_1_identifier',
        'policy_2_identifier',
        'policy_3_identifier',
    }
}
```

Continuing with the example, entity node 220 may correspond to an account. An account policy summary be stored according to an account policy summary schema, such as:

```
Account_Summary = {
    'service': {
        'action': ActionNode,
        'action': ActionNode,
        '*': ActionNode
    },
    'service': {
        'action': ActionNode,
        '*': ActionNode
    },
    'service_control_policies': {
        'scp_identifer',
        'scp_identifer'
    }
}
```

Below is an example of an account summary:

```
Account_Summary_Sample = {
    'virtual_compute_service': {
        'describeinstances': ActionNode,
        'describekeypairs': ActionNode,
        'describesecuritygroups': ActionNode,
        'describeavailabilityzones': ActionNode,
        'runinstances': ActionNode,
        'terminateinstances': ActionNode,
        'stopinstances': ActionNode,
        'startinstances': ActionNode
    },
    'object_storage_service': {
        '*': ActionNode,
        'listallmyobjects': ActionNode,
        'headobject': ActionNode
    },
    'service_control_policies': {
        'policy_1_identifier',
        'policy_2_identifier',
        'policy_3_identifier',
    }
}
```

Continuing with the example, entity node 230 may correspond to a principal. An account policy summary be stored according to an account policy summary schema, such as:

```
Principal_Summary = {
    'principal_arn': {
        'service': {
            'action': ActionNode,
            'action': ActionNode,
            '*': ActionNode
        },
        'condition_payload': ConditionPayload (
            entity='IAM entity',
            principal_account='account number',
            principal_identifier='full identifier',
            region='region',
            tags= {
                'condition key':
                'condition value',
                'condition key':
                'condition value'
            },
            org_paths='org path'),
        'permission_boundary_policy': {
            'pb_identifier',
            'pb_identifier'
        }
    }
}
```

Below is an example of a principal summary:

```
Principal_Summary_Sample = {
    'principle_identifier: {
        'object_storage_service': {
            'listallmyobjects': ActionNode,
            'headobject': ActionNode,
            '*': ActionNode
        },
        'condition_payload': ConditionPayload (
            entity='principal',
            principal_account='identifier',
            principal_identifier='full_id',
            region=' ',
            tags= {
                'test-key': 'test-value',
                'BESTKEY': 'TEST'
            },
            org_paths=None),
        'permission_boundary_policy': {
```

```
        'pb_identifier1',
        'pb_identifier2'
      }
    }
  }
```

In addition to entity nodes, policy nodes, such as policy node 212a, 212b, 222a, 222b, 232a, and 232c may be stored as part of tree structure of policy summar(ies) 120. Policy nodes may correspond to various types of policies. Like entities, different cloud service providers may utilize different access policies for specifying allowed or denied actions with respect to resources of a cloud service provider which may be applied to associated entities. For example, different policies may include, in some embodiments, service control policies (e.g., associated with entities, such as organization units or accounts), resource-based policies (e.g., associated with resources), identity-based policies (e.g., associated with entities such as principals), or permission boundary policies (e.g., an identified policy that may define the maximum permissions that can be granted), among other policy types.

Policy nodes may provide a portion of information used to produce or represent a policy summary, in some embodiments. An example of a schema for a policy summary may be:

```
Policy_Summary_Sample = {
  'statements': ["List of statement hashes"],
  'summary': {
    'service': {
      'action': 'Allow | Deny',
      'action': 'Allow | Deny',
    },
    'service': {
      'action': 'Allow | Deny',
      'action': 'Allow | Deny',
    }
  }
}
```

Below is an example of a policy summary:

```
Policy _Summary = {
  'statements': ["List of statement hashes"],
  'summary': {
    'virtual_compute_service': {
      'describesecuritygroups': 'Deny',
      'runinstances': 'Allow'
    },
    'object_storage_service': {
      'listallmyobjects': 'Deny'
    }
  }
}
```

In various embodiments, statement summaries may also be used to store the effects of access policy statements in order to increase reusability, which lowers computational costs when generating an access analysis for an entity. An access policy may be specified using different statements (as noted earlier). A statement summary may be generated from one (or more) statements, stored, and then referenced by policy summaries (allowing the same statement policy summaries to be used by different policies when logically equivalent to the statements found in the different policies).

For instance, in the example policy above, the "statements" section includes a "List of statement hashes." These statement hashes may be used to lookup to statement summaries which describe the effect of the statements that implement the policy being summarized. Moreover, when new statement(s) (e.g., statements that have not been analyzed before) are encountered, a new statement summary and new entry may be added corresponding to the "new" hash value produced.

Statement hashes may be generated from the contents of one (or more) portions of the statement(s) that are summarized, which may allow for a hash value generated from other statement(s) using the same hash scheme to produce a hash value that would map to an existing statement. The data structure that stores summaries (e.g., the action map referenced above) may then have different corresponding entries for the respective hash values of each statement summary which can be located when performing access analysis.

An example of a schema for a statement summary may be:

```
Statement_Summary_Sample = {
  ' summary': {
    'service': {
      'action': 'Allow | Deny',
      'action': 'Allow | Deny'
    }
  }
  conditions': {
    'condition statement(s) to be evaluated'
  },
  'resources': {
    'resource identifiers'
    '*'
    etc.
  }
}
```

As illustrated in FIG. 2, various action nodes, such as action nodes 214a, 214b, 214c, 224a, 224b, 224c, 234a, 234b, and 234c may be included in tree structure of policy summar(ies), which may indicate the actions that may allowed (or denied). An example schema of an action node may be described as:

```
Action_Node = {
  'Effect': 'Allow Condition Deny',
  'policy_type': [
    'policy_identifier',
    'policy_identifier'
  ],
  'policy_type': [
    'policy_identifier',
    'policy_identifier'
  ],
  'policy_identifier': [
    'policy_identifier',
    'policy identifier'
  ],
  'SharedWithParent': 'True False',
  'OverrodeParent': 'True False',
  'policy_Implicit_Deny': 'True False',
}
```

An example of an action node specified according to the above schema may be:

```
Action_Node_Sample = {
  'Effect': 'Allow',
  'Identity_Policies': [
    'identity_policy_A'
  ],
```

```
'Permission_Boundary_Policies': [
    'permission_policy_1'
],
'Service_Control_Policies': [
    'service_control_policy_1'
],
'SharedWithParent': False,
'OverrodeParent': False,
'PB_Implicit_Deny': False,
'SCP_Implicit_Deny': False
}
```

Storing policy summaries as part of a tree structure like tree structure of policy summar(ies) 120 may support various traversal techniques to identify different stored policy summaries when generating an access analysis. For example, various techniques may be discussed below with regard to FIG. 7. In one traversal technique in one embodiment, the following steps may be performed. For instance, policies attached to a root entity (or other node) of tree-structure may be accessed and added to various summary objects (if not present). If, for example, policy node 212b is not included in the policy summary as represented in entity node 210 and(or) action node(s) 214a, 214b, or 214c, the corresponding access policy (e.g., a service control policy) may be parsed to determine which actions are permitted or denied for a given service of a cloud provider network (e.g., as specified in access policy statements). Then updates to action node(s) may be updated (or created) to store the effects of the new policy. For example, action node 214a may be created (or updated) to include an action from the parsed policy and its respective action (allow or deny) along with various other information as described in the action node schema discussed above.

After considering the root entity, a next entity node, such as entity node 220, may be identified. This identity node may be identified according to the location of a corresponding entity node in tree structure of policy summar(ies) 120 of a given entity under analysis. For example, a principal corresponding to entity node 230 were given (e.g., in a request) for access analysis, then the portions of tree structure of policy summar(ies) 120 that include the entity node 230 may be considered (e.g., entity node 220 and entity node 230), while other portions of tree structure policy summar(ies) 120 that are not included (e.g., other principal entity nodes, other account entity nodes, and other organization unit nodes, which are not illustrated in FIG. 2) may be excluded from evaluation. As with the previous entity node, any policies that have not yet been evaluated may be used to update policy summaries. In some embodiments, a same policy (e.g., a service control policy) may be attached or otherwise associated with multiple different entities. Thus, by storing the summaries of policies, the work of parsing summaries may be saved (even if new action nodes for an entity that has not previously been updated as associated with the policy may be updated) and used again for updating tree structure of policy summar(ies) 120. In some embodiments, the policy summar(ies) from a parent entity node (e.g., entity node 210) may be compared with any new policies. If a "deny" is found, for example, then a corresponding action node for the current entity node 220 may be updated as well so that action nodes attached to entity node 220 (e.g., action nodes 224a, 224, and 224c) reflect the application of both parent policies and policies directly attached to entity node 220.

The next entity node may be considered, in some embodiments, entity node 230, which is a child node of entity node 220 and which is the entity node under consideration for access analysis (e.g., the principal under consideration). As with the previous entity nodes, any policies that have not yet been evaluated may be used to update policy summaries. For example, for principals, other types of policies may be applied, such as an identity policy. These unevaluated policies may be parsed, and their statements used to update action nodes, such as action nodes 234a, 234b, or 234c. Similar to the discussion above, the policy summar(ies) from a parent entity node (e.g., entity node 220) may be compared with the newly evaluated policies. In some embodiments, any actions that appear in policies directly attached to entity node 230 but do not appear in parent entity node 220 may be updated as "deny" because the intersection of actions allowed in the parent and child may be the allowed actions in the access analysis (e.g., a deny in either location may always override an allow (or non-statement) in another policy).

In some embodiments, some determinations at one location in tree structure of policy summaries 120 may be propagated to other locations. For example, a deny of an action node (e.g., an action for a particular service of a cloud provider) attached to a higher entity node (e.g., a deny for action node 214a) may propagate down to the corresponding action nodes that are for the same action in child entity nodes (e.g., deny may also be stored in action node 224a and 234a). Such techniques may reduce the evaluation of actions at the lower-level entity nodes, in some embodiments.

Please note that previous descriptions of a cloud service provider 100, set of access policies 102, access policy analysis system 110, and tree structure of policy summar(ies) 120 are not intended to be limiting, but are merely provided as example embodiments. As discussed below, various different computing systems or devices may implement techniques for using stored policy summaries for efficient analysis for cloud provider entities.

This specification continues with a general description of a cloud security service that may implement using stored policy summaries for efficient analysis for cloud provider entities. Then various examples of the cloud security service are discussed, including different components/modules, or arrangements of components/module, that may be employed as part of implementing the cloud security service, in some embodiments. A number of different methods and techniques to implement using stored policy summaries for efficient analysis for cloud provider entities are then discussed, some of which are illustrated in accompanying flowcharts. Finally, a description of an example computing system upon which the various components, modules, systems, devices, and/or nodes may be implemented is provided. Various examples are provided throughout the specification.

Figure 3:
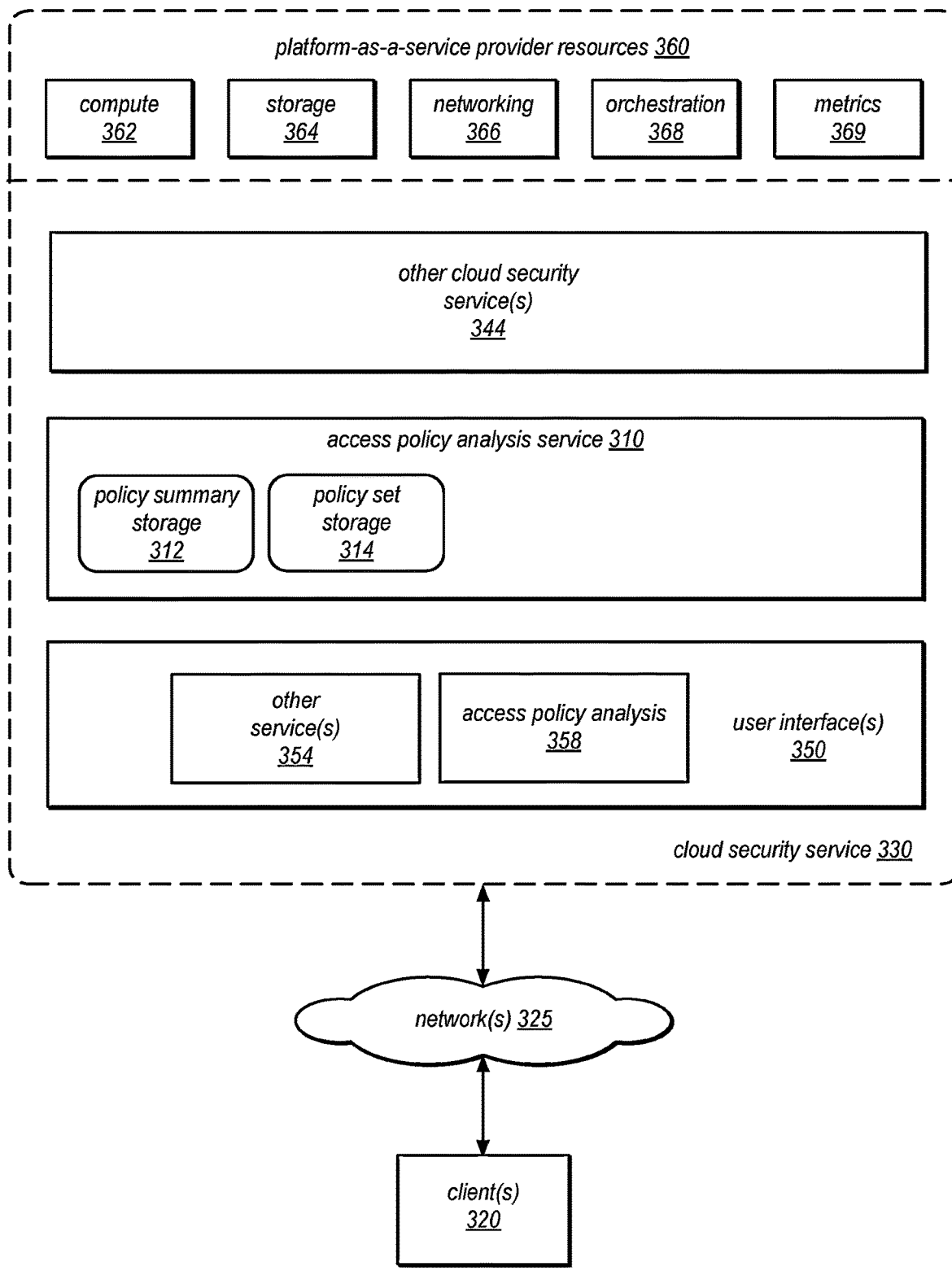
FIG. 3 is a block diagram illustrating a cloud security service that includes an access policy analysis service that uses using stored policy summaries for efficient analysis for cloud provider entities, according to some embodiments.

FIG. 3 is a block diagram illustrating a cloud security service that includes an access policy analysis service that uses using stored policy summaries for efficient analysis for cloud provider entities, according to some embodiments.

As shown in the figure, a cloud security service 330 is implemented using a platform-as-a-service (PaaS) provider network 360 (which may itself be a cloud provider network in some embodiments). The cloud security service 330 may be operated by a provider company to provide a number of cloud-based client-facing cloud security services 310 and 344 to various clients. Client(s) 320 may be operated by different groups, organizations, companies, or other types of entities that are customers of the cloud security service 330.

In some embodiments, different clients may be associated with different user accounts of the cloud security service 330.

Client(s) 320 may enable, disable, execute, or otherwise configure (through user interface(s) 350), various security services 310 and 344, on behalf of different resources hosted in a cloud provider service. For example, access policy analysis service 310 may provide access analysis for access policies of a cloud provider, as discussed in detail above with regard to FIG. 1 and below with regard to FIGS. 4-7. Other cloud security service(s) 344 may include, but not limited to, visibility and monitoring services to maintain an accurate inventory of different cloud provider resources, automate and provide real-time remediation security controls and tools, risk assessment and auditing of resources in a cloud provider service, threat detection, resource configuration change monitoring, code security and compliance, among other cloud security services. A cloud provider service may be the same as the PaaS service or a different cloud service provider, and may include different types of computing, storage, networking, orchestration, and metrics resources. For example, computing resources may include different virtual machines that are an instance of an emulated computer or execution environment that is hosted on a physical virtual machine host. The virtual machine host may implement virtualization hardware and/or software (e.g. hypervisors) to execute and manage multiple instances of guest operating systems. Example implementations of such virtualization technologies include VMWARE ESX/ESXI, MICROSOFT HYPERV, AMAZON WEB SERVICES, and MICROSOFT AZURE. Another type of virtual machine is the container, which provides a portable and isolated execution environment over a host operating system of a physical host. Example implementations of container technologies include DOCKER, GOOGLE KUBERNETES, AMAZON WEB SERVICES, and MICROSOFT AZURE. Similar techniques may be implemented to host other computing, storage, networking, orchestration, or other resources. For example, instances may be database instances that host a database system or a data storage instance that hosts a virtual disk or other storage device. As discussed above with regard to FIG. 1, access to these computing resources by various entities of the respective cloud service providers may be allowed or denied according to specified access policies.

In various embodiments, the network(s) 325 may encompass any suitable combination of networking hardware and protocols necessary to establish communications between the client(s) 320 and the cloud security service 330. In some embodiments, client(s) 320 may execute in a private network of a company, behind a company firewall, and the network 325 may include a public network such as the Internet, which lies outside the firewall. The network 325 may encompass the different telecommunications networks and service providers that collectively implement the Internet. In some embodiments, the network 325 may also include private networks such as private local area networks (LANs), private wide area networks (WANs), or private wireless networks. The network 325 may be implemented using different hardware (e.g., modems, routers, switches, load balancers, proxy servers, etc.) and software (e.g., protocol stacks, accounting software, firewall/security software, etc.) for establishing networking links between client(s) 320 and the cloud security service 330.

As shown, the cloud security service 330 may implement access policy analysis service 310. As discussed in detail below with regard to FIGS. 4 and 5, access policy analysis service 310 may perform access analysis for given entities and resources using the techniques discussed above with regard to FIG. 1. For example, access policy analysis service 310 may, as discussed with regard to FIG. 4, ingest a set of access policies in order to generate policy summaries that may be stored and used at a later time to perform access analysis. As discussed with regard to FIG. 5, access policy analysis service 310 may use the generated policy summaries as part of generating the access analysis for a given entity and resource.

Access policy analysis service 310 may implement policy set storage 314, in some embodiments. Policy set storage 314 may be an object, file, database, or other data storage system that can store set of access policies that are to be considered when performing an access policy analysis for a user. Policy set storage 314 may, for example, index different sets of policies tied to different accounts of cloud security service 330 (e.g., according to an account identifier) so that when ingestion or access analysis is performed on behalf of a user associated with the account, the correct policy set is accessed and used. Moreover, policy set storage 314 may implement various security or other controls for restricting access to policy sets to perform authorized analyses (e.g., only a user of an account can access that account's set of access policies and not another user of another access account).

Access policy analysis service 310 may implement policy summary storage 312, in some embodiments. Policy summary storage 312 may be an object, file, database, or other data storage system that can store policy summaries and corresponding structures (e.g., the policy summaries and tree structure of policy summar(ies) 120 discussed in detail above with regard to FIG. 2) that are to be used when performing an access policy analysis for a user. Policy summary storage 312 may, for example, index different sets of policy summaries and tree structures tied to different accounts of cloud security service 330 (e.g., according to an account identifier) so that when ingestion or access analysis is performed on behalf of a user associated with the account, the correct set of policy summaries and tree structure is accessed and used. Moreover, policy summary storage 312 may implement various security or other controls for restricting access to policy summaries to perform authorized analyses (e.g., only a user of an account can cause access to that account's set of policy summaries and tree structure and not another user of another access account).

As shown, the cloud security service 330 may also implement a user interface 350, which provides the interfaces 354 and 358, as discussed. The user interface 350 may be a web-based interface that is accessible via a web browser. The user interface 350 may be a graphical or command line user interface. In some embodiments, the user interface 350 may also include real-time notification interfaces such as email or text interfaces. In some embodiments, the user interface 350 may be implemented as part of a user console to allow users to configure various aspects of the cloud security service 330, receive assessments reports, and carry out remediation actions. In some embodiments, the user interface 350 will allow users to specify how access policy analysis service 310 should operate (or how other cloud security service(s) should operate).

As a whole, the cloud security service 330 may be implemented as a number of web services that receive web services requests formatted as JSON documents. The cloud security service 330 may support REST-style or document-based (e.g., SOAP-based) types of web services requests. In some embodiments, the cloud security service 330 may implement service interfaces using other types of remote procedure calling protocols, such as GOOGLE PROTOCOL BUFFERS or PROTOBUF. The PaaS provider network may provide hardware and/or software to implement service endpoints, such that a request directed to that endpoint is properly received and processed.

As shown, the PaaS provider network may provide different types of computing resources 360 for the machine monitoring service 330, which can be leased by the operator of the machine monitoring service 330. The PaaS provider may provide resource services such as compute resource service 362, storage resource service 364, networking resources service 366, orchestration service 368, and resource metrics service 369. The services of the cloud security service 330 may be built using these underlying resource services provided by the PaaS provider. In some embodiments, the PaaS resources 360 may implement features such as load balancing of incoming service requests and/or dynamic management and scaling of service node pools. In some embodiments, each of the services 310 and 344 may be implemented using a pool of service nodes provided by the PaaS provider, which may be individual instances of virtual machines. In some embodiments, the PaaS provider may be a provider such as AMAZON WEB SERVICES or MICROSOFT AZURE.

Figure 4:
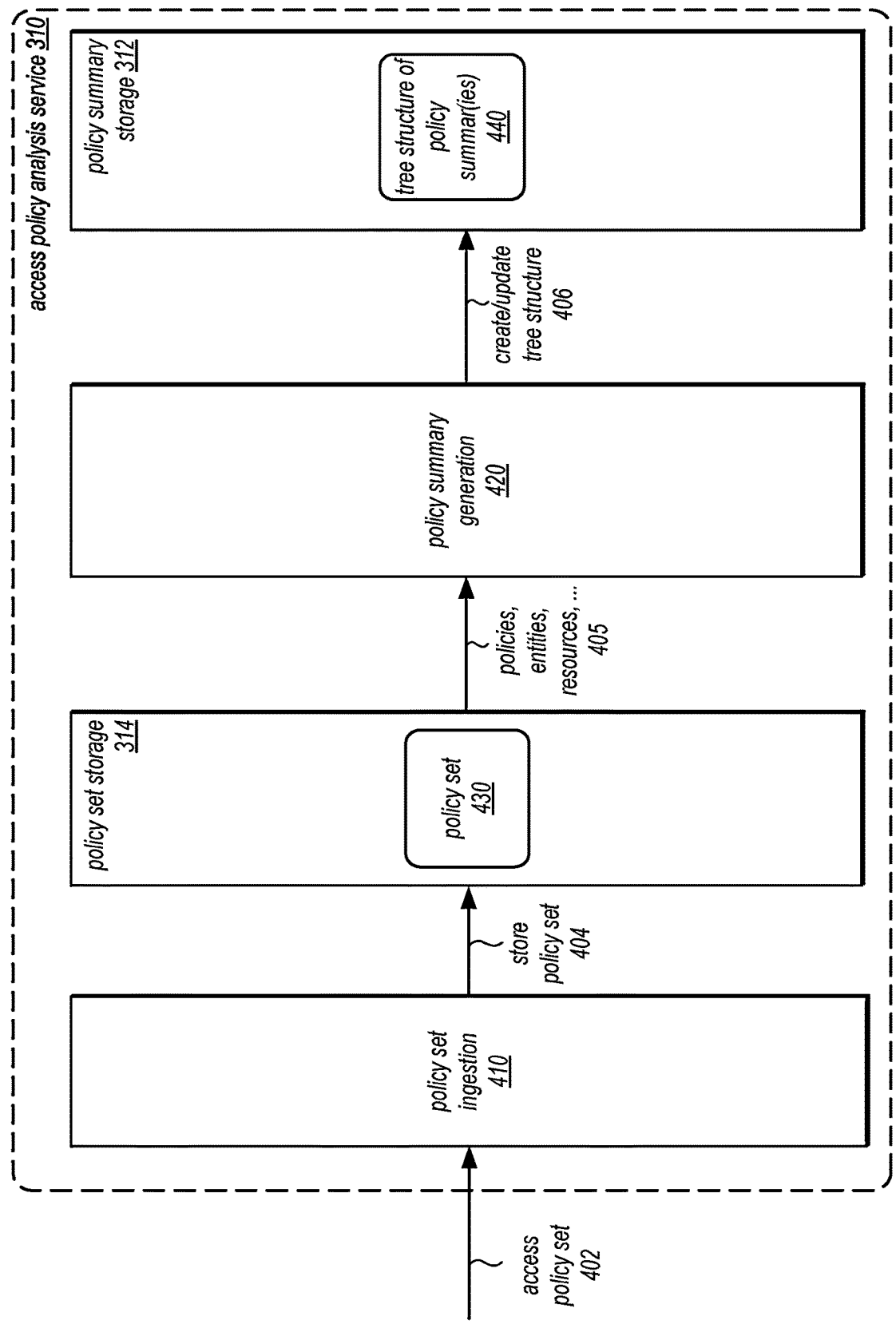
FIG. 4 is a block diagram illustrating policy set ingestion of an access policy analysis service, according to some embodiments.

Access policy analysis service 310 may implement different techniques for obtaining access policy sets to be used for access policy analysis. FIG. 4 is a block diagram illustrating policy set ingestion of an access policy analysis service, according to some embodiments. As illustrated in FIG. 4, access policy analysis service 310 may implement policy set ingestion 410. Policy set ingestion 410 may proactively obtain an access policy set 402 by reading from a specified storage location for access policy set 402 or by obtaining access credentials to obtain access to the set of access policies in the cloud service provider. In some embodiments, policy set ingestion 410 may receive access policy set 402 as part of an interface implemented by cloud security service, such as access policy analysis 358 implemented as part of user interface(s) 350.

Policy set ingestion 410 may store 404 a copy of the access policy set 440, in some embodiments, in policy set storage 314. For example, policy set ingestion 410 may access (or create) a storage location corresponding to an account of cloud security service 330 associated with policy set 440 to store policy set 440. In some embodiments, policy set ingestion 410 may check for subsequent updates to access policy set 440 (e.g., by polling for updates). In some embodiments, policy set ingestion 410 may receive and then store updates to policy set 440.

In some embodiments, policy summary generation 420 may generate (prior to any analysis request) at least a portion of a tree structure for policy summaries. For example, policy summary generation may access the various policies, entities, and resources specified in policy set to create or update 406 a tree structure 440 in policy summary storage 312. As discussed above with regard to FIGS. 1 and 2, policy summaries may be created according for different entities including links, branches, or other paths between entities that indicate relationships between entities (e.g., organization unit→account(s)→principal(s)) which may then be later traversed as part of performing an access analysis. In some embodiments, tree structure of policy summar(ies) 440 may be incrementally updated as new access policies are obtained and added to policy set 430.

Figure 5:
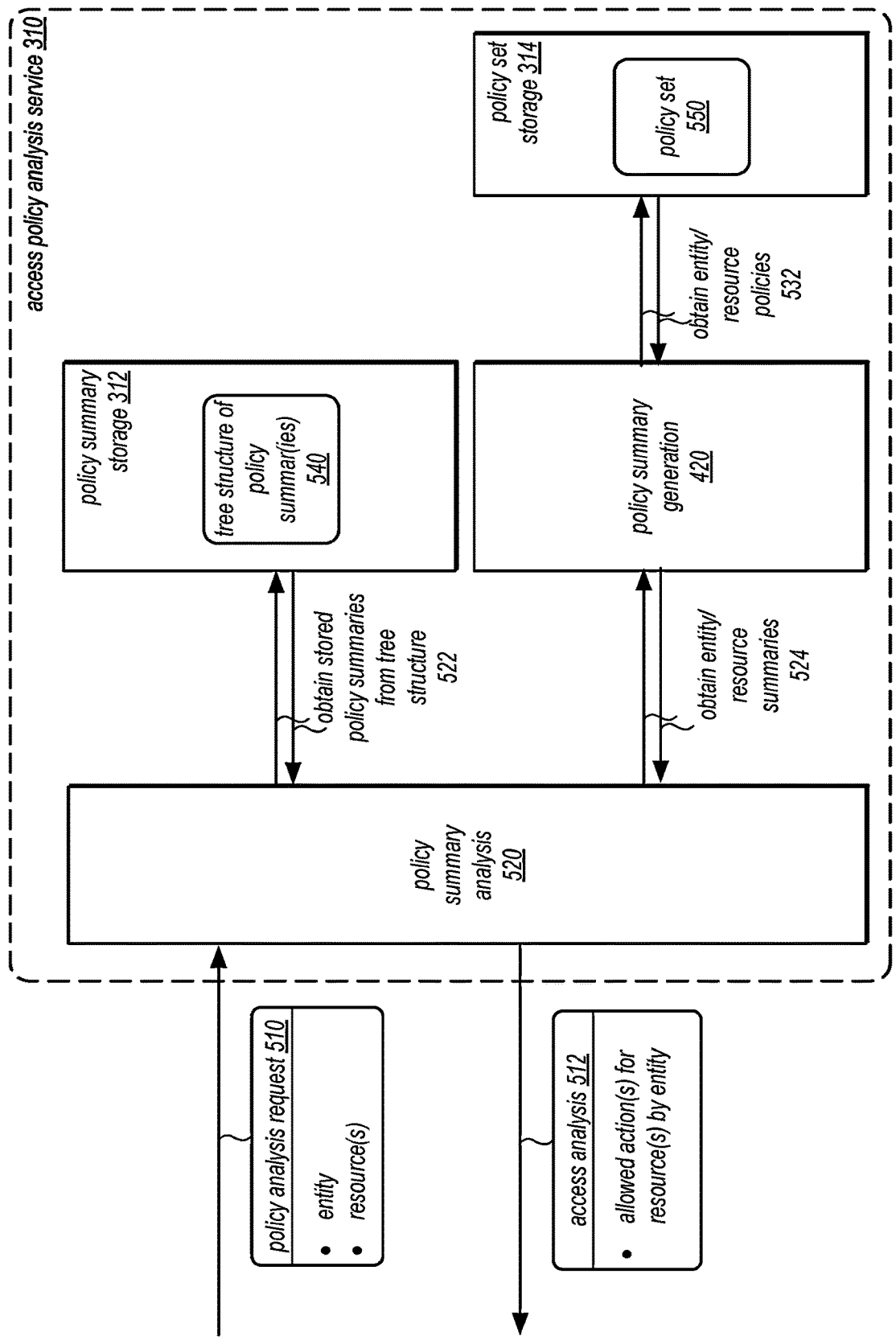
FIG. 5 is a block diagram illustrating policy analysis requests, according to some embodiments.

FIG. 5 is a block diagram illustrating policy analysis requests, according to some embodiments. Access policy analysis service 310 may implement policy summary analysis 520 to generate access analysis 512 according to the techniques discussed above with regard to FIGS. 1 and 2 and below with regard to FIGS. 6 and 7. For example, a request, such as policy analysis request 510 may be received, which may specify an entity (e.g., a principal by a principal identifier) and one (or more) resources (e.g., by resource identifier) for which an access analysis 512 is to be generated. Policy analysis request 510 may be received via user interface 348, in some embodiments.

Policy summary analysis 520 determine which policy summaries need to be generated and which stored policy summaries exist that can be used to generate access analysis. For example, policy summary analysis 520 may start with a root node of tree structure of policy summaries 540, and traverse down the tree structure of policy summaries 540 to obtain 522 stored policy summaries for relevant entity nodes in a path leads to the entity specified in policy analysis request 510. For example, a root entity node (e.g., organization unit), one or more interior entity nodes (e.g., account entity node), and a leaf entity node (e.g., a principal entity node) may be obtained. Note, as discussed above, that each policy summary obtained from tree structure 522 may be updated to include new information from newly encountered access policies (e.g., access policies added or modified after a policy summary was generated). In some embodiments, policy summary analysis 520 may be able to use version numbers or timestamps to identify whether a policy summary reflects a most recent set of access policies in order to determine whether an existing (or new) access policy needs to be evaluated and used to update a policy summary.

In some scenarios, policy analysis request 510 may rely upon stored policy summaries obtained 522 from tree structure of policy summar(ies) 540 to generate access analysis 512 (e.g., when a policy summary for a requested entity already exists). In some scenarios, new policy summaries may be generated. For example, an entity may be a principal that has not been evaluated before and thus no policy summary analysis for that principal may be stored in tree structure of policy summar(ies) 540. Policy summary analysis 520 may obtain 524 the entity policy summary from policy summary generation 420, which may (as discussed earlier) access the policy set 550 associated with a user/account of cloud security service and policy analysis request 510, in order to obtain resource/entity policies 532 (e.g., policies attached or otherwise associated with the entity and resource). Policy summary generation 420 may then parse the obtained policies to extract permissions and produce the entity and policy summaries provided to policy summary analysis 520.

Policy summary analysis 520 may then return access analysis 512 which may specify the allowed action(s) for resource(s) by the entity. Access analysis 512 may be formatted in various ways, including graphical user interface elements, text displays, and/or other supported types of interfaces discussed above with regard to user interface 350 in FIG. 3.

Figure 6:
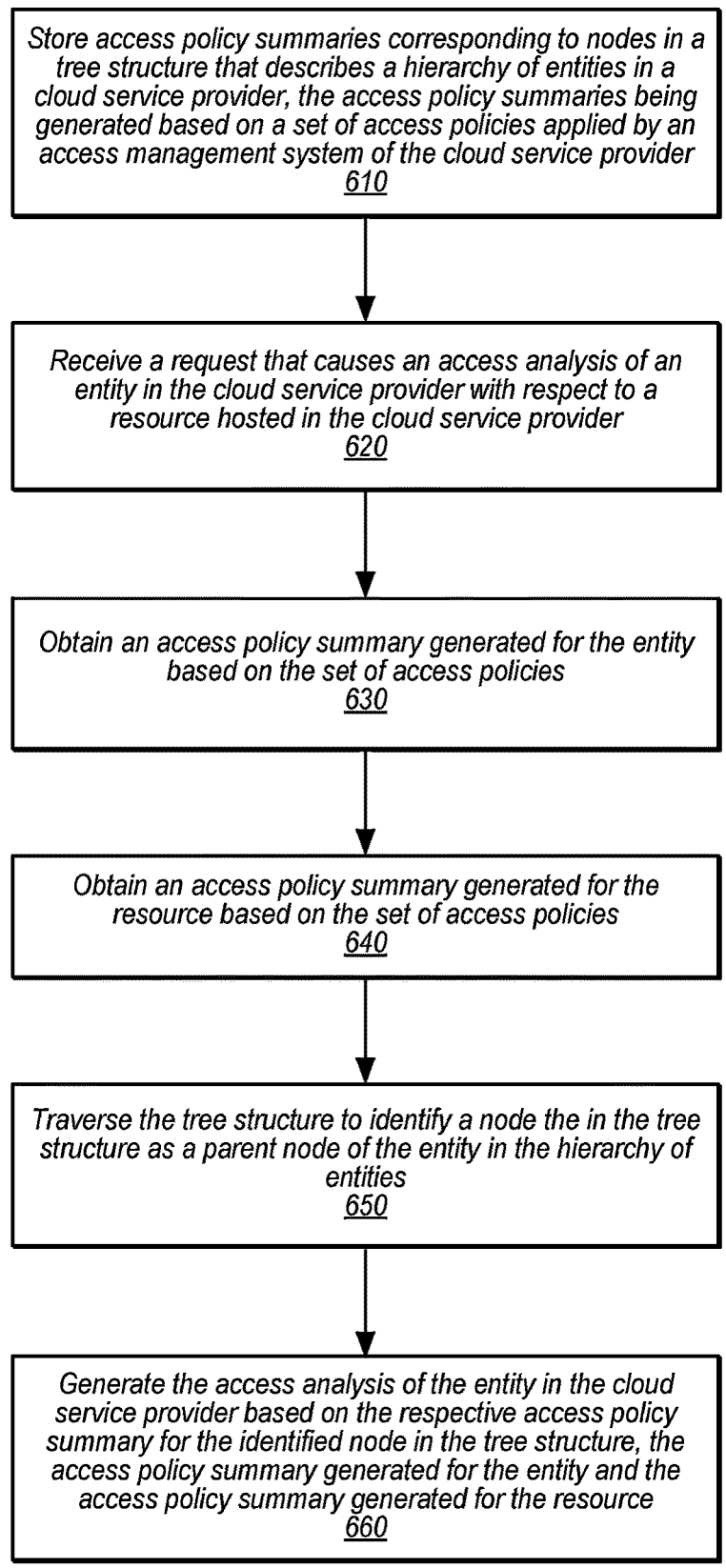
FIG. 6 is a flowchart illustrating a method that uses stored policy summaries for efficient analysis for cloud provider entities, according to some embodiments.

The examples of an access policy analysis system that uses stored policy summaries for efficient access analysis as discussed in FIGS. 2-5 above have been given in regard to a cloud security service. However, various other types of systems, services, or applications can advantageously implement uses stored policy summaries for efficient analysis for cloud provider entities, in other embodiments. FIG. 6 is a flowchart illustrating a method that uses stored policy summaries for efficient analysis for cloud provider entities, according to some embodiments. These techniques, as well as the techniques discussed below with regard to FIG. 7, may be implemented using components or systems as described above with regard to FIGS. 1-5, as well as other types of systems, and thus the following discussion is not intended to be limiting as to the other types of systems that may implement the described techniques.

As indicated at 610, access policy summaries corresponding to nodes in a tree structure that describes a hierarchy of entities in a cloud service provide may be stored, in various embodiments. The access policy summaries may be generated based on a set of access policies applied by an access management system of a cloud servicer provider. For example, an ingestion process that obtains and generates policy summaries for the different entities and includes them in the tree structure may be performed when the set of access policies are received. In some embodiments, access policy summaries may be generated and stored when need to perform an access analysis. For example, a first access analysis for an entity in the hierarchy may cause the generation of different policy summaries to be included in a newly created tree structure. In such embodiments, the tree structure may be incrementally updated to include new policy summaries generate for subsequent access analyses.

As indicated at 620, a request that causes an access analysis of an entity in the cloud service provider with respect to a resource hosted in the cloud service provider may be received, in some embodiments. For example, a user interface (e.g., user interface 348 for access policy analysis service 310) may support requests to perform an access analysis. In some embodiments, a programmatic interface (e.g., API) that is used by other systems, services or applications that rely upon an access analysis (e.g., to enforce access controls or simulate access controls) may submit requests that cause the access analysis. Entities may be identified by an identifier (e.g., by a globally unique identifier for the entity in the cloud service provider). Similarly, resources may be identified by an identifier (e.g., by a globally unique identifier for the resource in the cloud service provider).

As indicated at 630, an access policy summary generated for the entity based on the set of access policies may be obtained. The access policy summary may be previously generated (e.g., as part of an ingestion process or as part of generating a prior access analysis in response to a previous request), in some scenarios. In some scenarios, the access policy summary for the entity may be generated in response to the request by accessing from the set of access policies those access policies attached or otherwise associated with the entity, parsing those access policies to extract permission information (e.g., allowed or denied actions) and then producing the access policy summary for the entity (e.g., according to a schema discussed above with regard to FIG. 2). As discussed above with regard to FIG. 2, producing an access policy summary may allow for reuse by checking (e.g., based on a statement hash value) whether one or more statement summaries can be used to describe the policy summary.

As indicated at 640, an access policy summary generated for the resource may be obtained based on the set of access policies, in some embodiments. Similar to the access policy summary for the entity, the access policy summary for the resource may be previously generated (e.g., as part of an ingestion process or as part of generating a prior access analysis in response to a previous request), in some scenarios. In some scenarios, the access policy summary for the resource may be generated in response to the request by accessing from the set of access policies those access policies attached or otherwise associated with the resource (e.g., resource access policies), parsing those access policies to extract permission information (e.g., allowed or denied actions with respect to the resource) and then producing the access policy summary for the resource (e.g., according to a schema discussed above with regard to FIG. 2).

As indicated at 650, the tree structure may be traversed to identify a node in the tree structure as a parent node of the entity in the hierarchy of entities, in some embodiments. For example, the traversal techniques discussed above with regard to FIG. 2 or below with regard to FIG. 7 may be used. In some embodiments, entity nodes further up a hierarchy than a parent entity node may also be identified and used. In some embodiments, the policy information in a policy summary for the parent entity node may alone be sufficient to perform an access analysis.

As indicated at 660, the access analysis of the entity in the cloud service provider may be generated based on the respective access policy summary for the identified parent node in the tree structure, the access policy summary generated for the entity itself, and the access policy summary generated for the resource, in some embodiments. For example, in embodiments where a denial of an action cannot be overridden by a policy associated with a higher or lower entity in a hierarchy (or a resource access policy), then the access analysis may be generated by determining the maximum permitted actions according to those actions that are explicitly denied in (or more) of the different access policy summaries. Those remaining actions (of possible actions) may be allowed and indicated as allowed in the access analysis (e.g. either individually indicated or by a symbol that includes all (or a subset of all) respective actions, such as the wildcard "*" symbol). In some embodiments, denied actions may be indicated. In some embodiments, access analysis may include the analysis of specific conditions, which indicate whether or not policy statements are applied. In such embodiments, the condition evaluation may be performed as part of determining maximum permitted actions given a determined condition. For example one (or more) conditions may be Boolean statements evaluated with respect to different features of a possible request context or other information by entity for performing an action, such as time since login, allowed request time ranges, or specific usernames, among other possible conditions.

Figure 7:
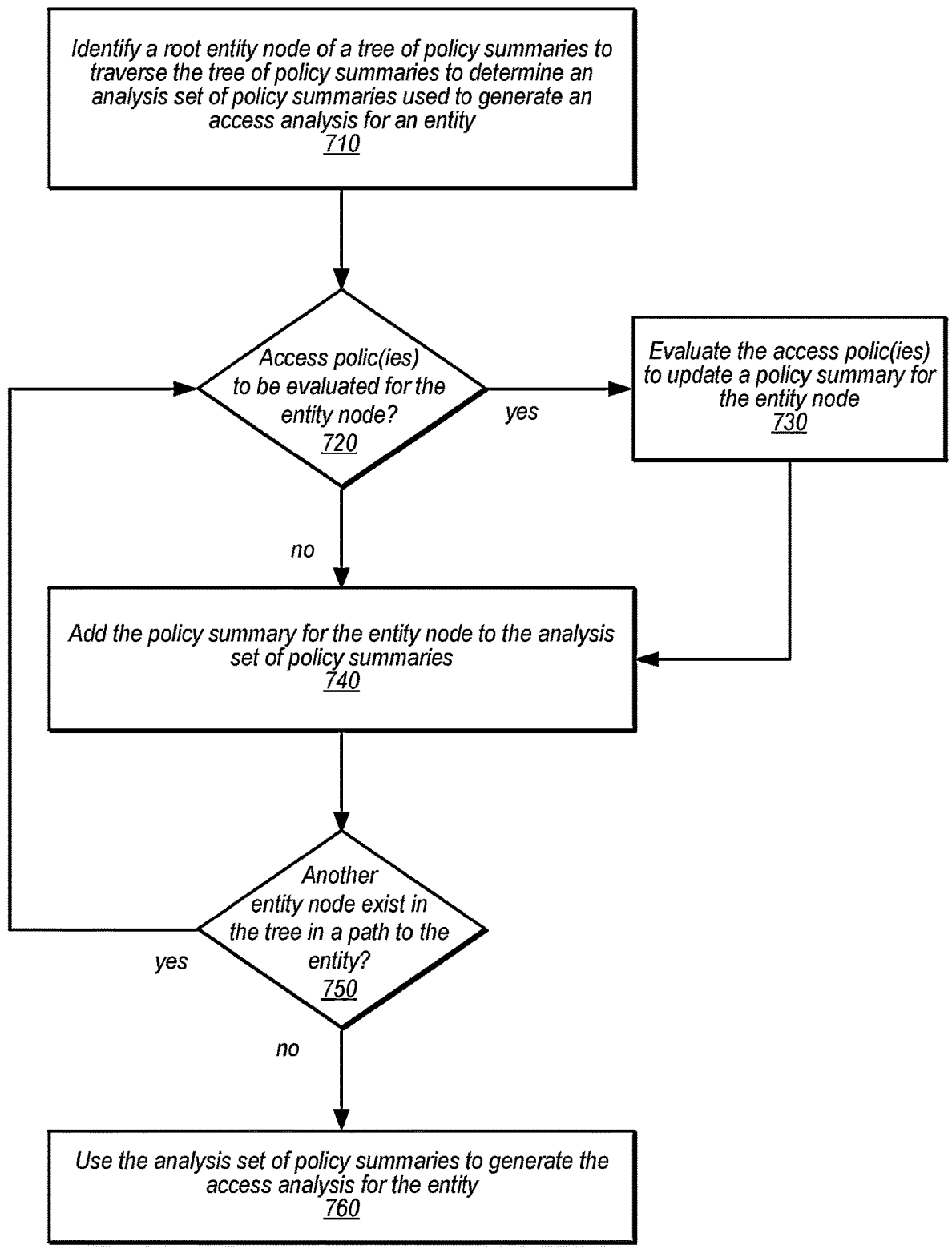
FIG. 7 is a flowchart illustrating a method for traversing a tree structure of policy summaries for performing access analysis, according to some embodiments.

As discussed earlier, a tree structure that stores previously generate access policy summaries may be used to efficiently perform access analysis. Different techniques for traversing such a tree structure may be used. FIG. 7 is a flowchart illustrating a method for traversing a tree structure of policy summaries for performing access analysis, according to some embodiments. As indicated at 710, a root entity node of a tree of policy summaries may be identified to traverse the tree of policy summaries to determine an analysis set of policy summaries used to generate an access analysis for an entity. For example, a highest level entity in a hierarchy of a cloud provider that includes the entity being analyzed (e.g., an organization unit) may be first identified.

As indicated at 720, a determination may be made as to whether any access policies have not yet been evaluated (or need to be reevaluated due to a modification) for the entity node, in some embodiments. For example, version information for a policy summary for the entity node may be compared with version information or timestamp information for access policies associated with the entity node to determine if the policies have a later version or timestamp. If one (or more) access policies need to be evaluated, then as indicated at 730, the access policies may be evaluated to update a policy summary for the entity node (e.g., root node on a first iteration of the technique). Like policy summary generation discussed above, the evaluation and update may include parsing those access policies to extract permission information (e.g., allowed or denied actions) and then making modifications to an existing access policy summary to account for those access policies. For example, additional statement summaries (that already exist) may be included as additional statement hashes (or statement hashes of new statement summaries that are created as part of updating the policy summary for the entity node). As indicated at 740, the policy summary for the entity node may be added to the analysis set of policy summaries, in some embodiments.

Traversing the tree structure may continue for additional entity nodes that exist in a path to the entity being evaluated. As indicated at 750, a determination may be made as to whether another entity node exists in the tree in a path to the entity, in some embodiments. For example, link, branch, or other path information may describe which entity nodes would be related to or in the path of the entity with respect to the entity node for which the policy summary was just added to the analysis set of policy summaries. Once no more entity nodes exist in the tree in the path to the entity (e.g., either having considered the entity node for the entity under evaluation or a parent node of the entity under evaluation), then the analysis set of policy summaries may be used to generate the access analysis for the entity, as indicated at 760.

The methods described herein may in various embodiments be implemented by any combination of hardware and software. For example, in one embodiment, the methods may be implemented by a computer system (e.g., a computer system as in FIG. 8) that includes one or more processors executing program instructions stored on a computer-readable storage medium coupled to the processors. The program instructions may be configured to implement the functionality described herein (e.g., the functionality of various servers and other components that implement a provider network described herein). The various methods as illustrated in the figures and described herein represent example embodiments of methods. The order of any method may be changed, and various elements may be added, reordered, combined, omitted, modified, etc.

Figure 8:
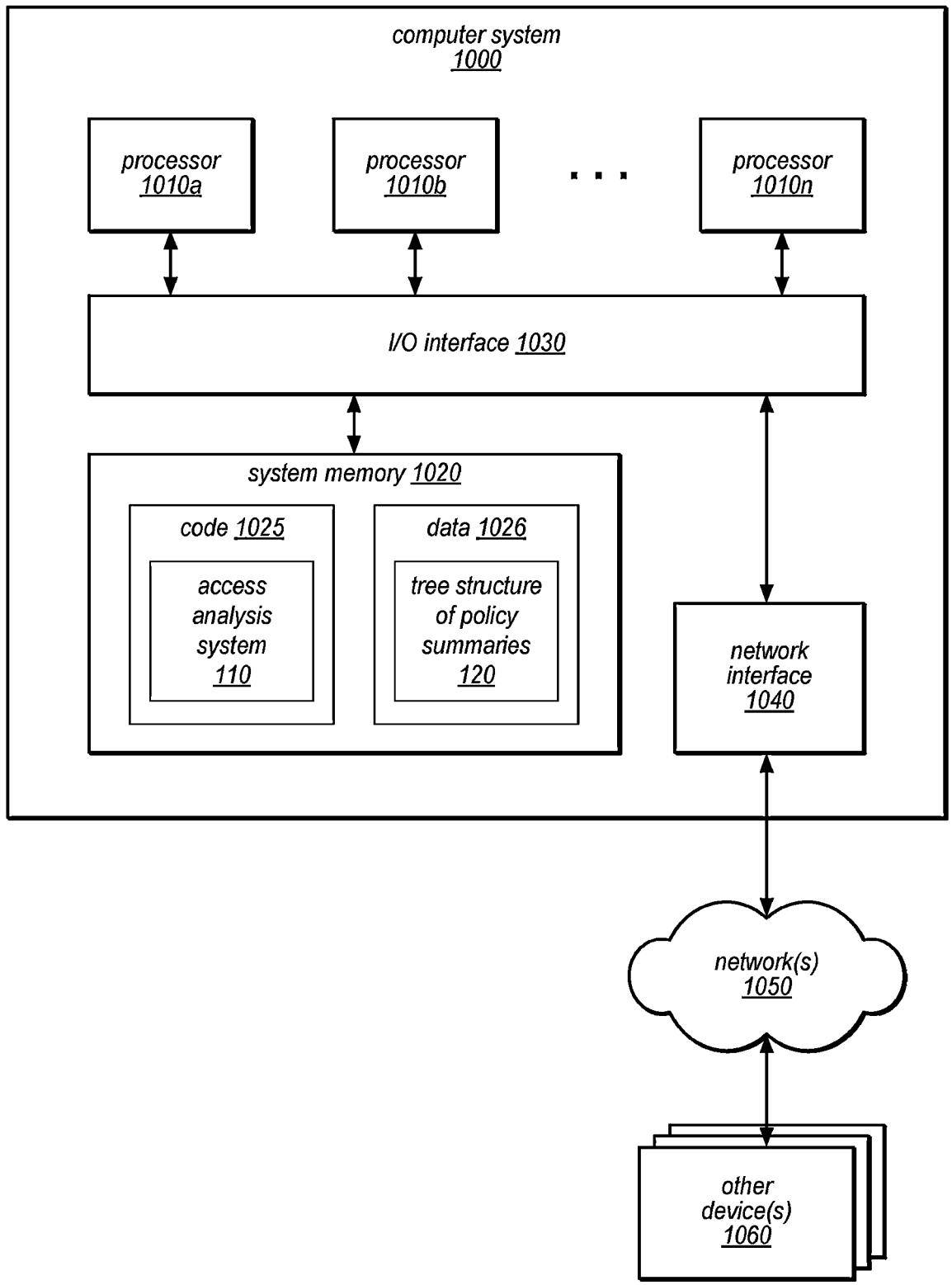
FIG. 8 is a block diagram illustrating an example computer system that can be used to implement one or more portions of an access analysis system, according to some embodiments.

FIG. 8 is a block diagram illustrating an example computer system that can be used to evaluate stored policy summaries for efficient access analysis, according to some embodiments. For example, the computer system 1000 may be a server that implements one or more components of the access analysis system 110 of FIG. 1. In some embodiments, the computer system 1000 may be used to implement one or more components of the cloud security service 330 of FIG. 3.

Computer system 1000 may be implemented using a variety of computing devices, such as a personal computer system, desktop computer, laptop or notebook computer, mainframe computer system, handheld computer, workstation, network computer, a consumer device, application server, mobile telephone, or some other type of computing device.

As shown, computer system 1000 includes one or more processors 1010, which may include multiple cores coupled to a system memory 1020 via an input/output (I/O) interface 1030. Computer system 1000 further includes a network interface 1040 coupled to I/O interface 1030. In some embodiments, computer system 1000 may be a uniprocessor system including one processor 1010, or a multiprocessor system including several processors 1010*a-n*, as shown. The processors 1010 may be any suitable processors capable of executing instructions. For example, in various embodiments, processors 1010 may implement one of a number of instruction set architectures (ISAs), such as the x86, PowerPC, SPARC, or MIPS ISA.

As shown, the computer system 1000 may also include one or more network communication devices (e.g., network interface 1040) for communicating with other systems and/or components over a communications network. For example, an instance of an application executing on computer system 1000 may use network interface 1040 to communicate with another server application executing on another computer system, as described herein.

As shown, computer system 1000 may use its network interface 1040 to communicate with one or more other devices 1060, such as persistent storage devices and/or one or more I/O devices. In some embodiments, some of these other devices may be implemented locally on the computer system 1000, accessible via the I/O interface 1030. In various embodiments, persistent storage devices may include disk drives, tape drives, solid state memory, other mass storage devices, or any other persistent storage device. The computer system 1000 may store instructions and/or data in persistent storage devices, and retrieve the stored instruction and/or data as needed.

As shown, the computer system 1000 may include one or more system memories 1020 that store instructions and data accessible by processor(s) 1010. In various embodiments, system memories 1020 may be implemented using any suitable memory technology, (e.g., one or more of cache, static random-access memory (SRAM), DRAM, RDRAM, EDO RAM, DDR 10 RAM, synchronous dynamic RAM (SDRAM), EEPROM, non-volatile/Flash-type memory, etc.). The system memory 1020 may be used to store code 1025 or executable instructions to implement the methods and techniques described herein. For example, the executable instructions may include instructions to implement the access analysis system 110, as discussed. The system memory 1020 may also be used to store data 1026 needed or produced by the executable instructions. For example, the in-memory data 1026 may include portions of a tree structure of policy summar(ies) 120, as discussed.

In some embodiments, some of the code 1025 or executable instructions may be persistently stored on the computer system 1000 and may have been loaded from external storage media. The persistent storage of the computer system 1000 and the external media are examples of non-transitory computer-readable storage media, which may be used to store program instructions to be executed by the computer system 1000. A non-transitory computer-readable storage medium may provide the capability to store information in a form readable by a machine (e.g., computer system 1000). Non-transitory computer-readable media may include storage media such as magnetic or optical media, disk or DVD/CD-ROM devices, archival tapes, network-attached storage systems, or other computer systems.

In some embodiments, the I/O interface 1030 may be configured to coordinate I/O traffic between processor 1010, system memory 1020 and any peripheral devices in the system, including through network interface 1040 or other peripheral interfaces. In some embodiments, I/O interface 1030 may perform any necessary protocol, timing or other data transformations to convert data signals from one component (e.g., system memory 1020) into a format suitable for use by another component (e.g., processor 1010). In some embodiments, I/O interface 1030 may include support for devices attached through various types of peripheral buses, such as a variant of the Peripheral Component Interconnect (PCI) bus standard or the Universal Serial Bus (USB) standard, for example. In some embodiments, the function of I/O interface 1030 may be split into two or more separate components, such as a north bridge and a south bridge, for example. Also, in some embodiments, some or all of the functionality of I/O interface 1030, such as an interface to system memory 1020, may be incorporated directly into processor 1010.

In some embodiments, the network interface 1040 may allow data to be exchanged between computer system 1000 and other devices attached to a network. The network interface 1040 may also allow communication between computer system 1000 and various I/O devices and/or remote storage systems. Input/output devices may, in some embodiments, include one or more display terminals, keyboards, keypads, touchpads, scanning devices, voice or optical recognition devices, or any other devices suitable for entering or retrieving data by one or more computer systems 1000. Multiple input/output devices may be present in computer system 1000 or may be distributed on various nodes of a distributed system that includes computer system 1000. In some embodiments, similar input/output devices may be separate from computer system 1000 and may interact with one or more nodes of a distributed system that includes computer system 1000 through a wired or wireless connection, such as over network interface 1050. Network interface 1040 may commonly support one or more wireless networking protocols (e.g., Wi-Fi/IEEE 802.11, or another wireless networking standard). In some embodiments, the network interface 1040 may support communication via telecommunications/telephony networks such as analog voice networks or digital fiber communications networks, via storage area networks such as Fibre Channel SANs, or via any other suitable type of network and/or protocol.

Although the embodiments above have been described in considerable detail, numerous variations and modifications may become apparent to those skilled in the art once the disclosed inventive concepts are fully appreciated. It is intended that the following claims be interpreted to embrace all such variations and modifications, and the above description to be regarded in an illustrative rather than a restrictive sense.

What is claimed is:

1. A system for access policy analysis, the system comprising:
    one or more hardware processors; and
    one or more non-transitory computer-readable storage media storing instructions, that when executed by the one or more hardware processors, cause the one or more hardware processors to perform:
        receiving an electronic request that causes an access analysis of an entity in a cloud service provider with respect to a resource hosted by the cloud service provider; and
        responsive to receiving the electronic request:
            obtaining a first electronic access policy summary generated for the entity based on a set of access policies applied by an access management system of the cloud service provider;
            obtaining a second electronic access policy summary generated for the resource based on the set of access policies applied by the access management system;
            identifying, in a tree structure that describes a hierarchy of entities in the cloud service provider, a parent node of a node representing the entity in the hierarchy of entities;
            obtaining a third electronic access policy summary for the parent node; and
            generating the access analysis of the entity in the cloud service provider based on the third electronic access policy summary for the identified parent node in the tree structure, the first electronic access policy summary generated for the entity and the second electronic access policy summary generated for the resource.

2. The system of claim 1, wherein identifying the parent node comprises:
    identifying a root entity node in the tree structure;
    adding an access policy summary for the root entity node to an analysis set of access policy summaries used to generate the access analysis; and
    for one or more other entity nodes in the tree structure determined to be in a path to the entity in the hierarchy of entities, adding respective access policy summaries for the one or more other entity nodes.

3. The system of claim 2, wherein the one or more non-transitory computer-readable storage media storing instructions store further instructions that, when executed, cause the one or more hardware processors to perform:
    for one of the root entity node or the one or more other entity nodes:
evaluating one or more access policies determined to be evaluated for the one entity node; and
    updating the access policy summary for the one entity node according to the evaluating before adding the access policy summary to the analysis set of access policy summaries.

4. The system of claim 1, wherein generating the access analysis of the entity in the cloud service provider based on the third electronic access policy summary for the identified parent node, the first electronic access policy summary generated for the entity and the second electronic access policy summary generated for the resource, comprises: evaluating one or more policy conditions included in one of the access policy summaries.

5. The system of claim 1, wherein the tree structure that describes the hierarchy of entities in the cloud service provider is generated as part of an ingestion process before receiving the electronic request.

6. The system of claim 1, wherein obtaining the first electronic access policy summary generated for the entity based on the set of access policies applied by the access management system comprises: generating the first electronic access policy summary from one or more access policies of the set of access policies that are associated with the entity.

7. The system of claim 1, wherein obtaining the second electronic access policy summary generated for the resource based on the set of access policies applied by the access management system comprises: generating the second electronic access policy summary from one or more access policies of the set of access policies that are associated with the resource.

8. The system of claim 1, wherein the access management system is implemented as part of a cloud security service, wherein the electronic request that causes the access analysis of the entity in the cloud service provider is received via a user interface of the cloud security service and wherein the access management system is further configured to return the access analysis via the user interface in response to the electronic request.

9. A method for access policy analysis, the method comprising:
using one or more one or more hardware processors to perform:
receiving an electronic request that causes an access analysis of an entity in a cloud service provider with respect to a resource hosted by the cloud service provider; and
responsive to receiving the electronic request:
obtaining a first electronic access policy summary generated for the entity based on a set of access policies applied by an access management system of the cloud service provider;
obtaining a second electronic access policy summary generated for the resource based on the set of access policies applied by the access management system;
identifying, in a tree structure that describes a hierarchy of entities in the cloud service provider, a parent node of a node representing the entity in the hierarchy of entities;
obtaining a third electronic access policy summary for the parent node; and
generating the access analysis of the entity in the cloud service provider based on the third electronic access policy summary for the identified parent node in the tree structure, the first electronic access policy summary generated for the entity and the second electronic access policy summary generated for the resource.

10. The method of claim 9, wherein identifying the parent node comprises:
identifying a root entity node in the tree structure;
adding an access policy summary for the root entity node to an analysis set of access policy summaries used to generate the access analysis; and
for one or more other entity nodes in the tree structure determined to be in a path to the entity in the hierarchy of entities, adding respective access policy summaries for the one or more other entity nodes.

11. The method of claim 10, further comprising:
for one of the root entity node or the one or more other entity nodes:
evaluating one or more access policies determined to be evaluated for the one entity node; and
updating the access policy summary for the one entity node according to the evaluating before adding the access policy summary to the analysis set of access policy summaries.

12. The method of claim 9, wherein generating the access analysis of the entity in the cloud service provider based on the respective access policy summary for the identified parent node in the tree structure, the access policy summary generated for the entity and the access policy summary generated for the resource, comprises evaluating one or more policy conditions included in one of the access policy summaries.

13. The method of claim 9, wherein the tree structure that describes the hierarchy of entities in the cloud service provider is generated as part of an ingestion process before receiving the electronic request.

14. The method of claim 9, wherein obtaining the first electronic access policy summary generated for the entity based on the set of access policies applied by the access management system comprises generating the first electronic access policy summary from one or more access policies of the set of access policies that are associated with the entity.

15. The method of claim 9, wherein the access management system is implemented as part of a cloud security service, wherein the electronic request that causes the access analysis of the entity in the cloud service provider is received via a user interface of the cloud security service and wherein the method further comprises returning the access analysis via the user interface in response to the electronic request.

16. One or more non-transitory computer-accessible storage media storing program instructions that, when executed by at least one computer hardware processor, causes the at least one computer hardware processor to perform a method for access policy analysis, the method comprising:
receiving an electronic request that causes an access analysis of an entity in a cloud service provider with respect to a resource hosted by the cloud service provider; and
responsive to receiving the electronic request:
obtaining a first electronic access policy summary generated for the entity based on a set of access policies applied by an access management system of the cloud service provider;
obtaining a second electronic access policy summary generated for the resource based on the set of access policies applied by the access management system;
identifying, in a tree structure that describes a hierarchy of entities in the cloud service provider, a parent node of a node representing the entity in the hierarchy of entities;
obtaining a third electronic access policy summary for the parent node; and
generating the access analysis of the entity in the cloud service provider based on the third electronic access policy summary for the identified parent node in the tree structure, the first electronic access policy summary generated for the entity and the second electronic access policy summary generated for the resource.

17. The one or more non-transitory computer-accessible storage media of claim 16, wherein identifying the parent node comprises:
identifying a root entity node in the tree structure;
adding an access policy summary for the root entity node to an analysis set of access policy summaries used to generate the access analysis; and
for one or more other entity nodes in the tree structure determined to be in a path to the entity in the hierarchy of entities, adding respective access policy summaries for the one or more other entity nodes.

18. The one or more non-transitory computer-accessible storage media of claim 16, wherein, in generating the access analysis of the entity in the cloud service provider based on the respective access policy summary for the identified parent node in the tree structure, the access policy summary generated for the entity and the access policy summary generated for the resource, the program instructions further cause the at least one computer hardware processor to perform:
evaluating one or more policy conditions included in one of the access policy summaries.

19. The one or more non-transitory computer-accessible storage media of claim 16, wherein, in obtaining the first electronic access policy summary generated for the entity based on the set of access policies applied by the access management system, the program instructions further cause the at least one computer hardware processor to perform: generating the first electronic access policy summary from one or more access policies of the set of access policies that are associated with the entity.

20. The one or more non-transitory computer-accessible storage media of claim 16, wherein the access management system is implemented as part of a cloud security service, wherein the electronic request that causes the access analysis of the entity in the cloud service provider is received via a user interface of the cloud security service and wherein the one or more non-transitory computer-accessible storage media store further program instructions that when executed on or across one or more processors further cause the at least one computer hardware processor to perform: returning the access analysis via the user interface in response to the electronic request.

\* \* \* \* \*